Figure 4:
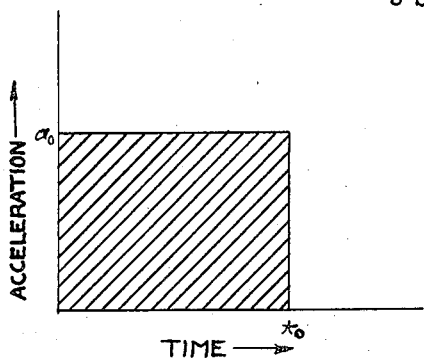

Dec. 7, 1948.　　　　C. E. CREDE　　　　2,455,356
SHOCK GAUGE
Filed July 4, 1944　　　　　　　　　　3 Sheets-Sheet 1
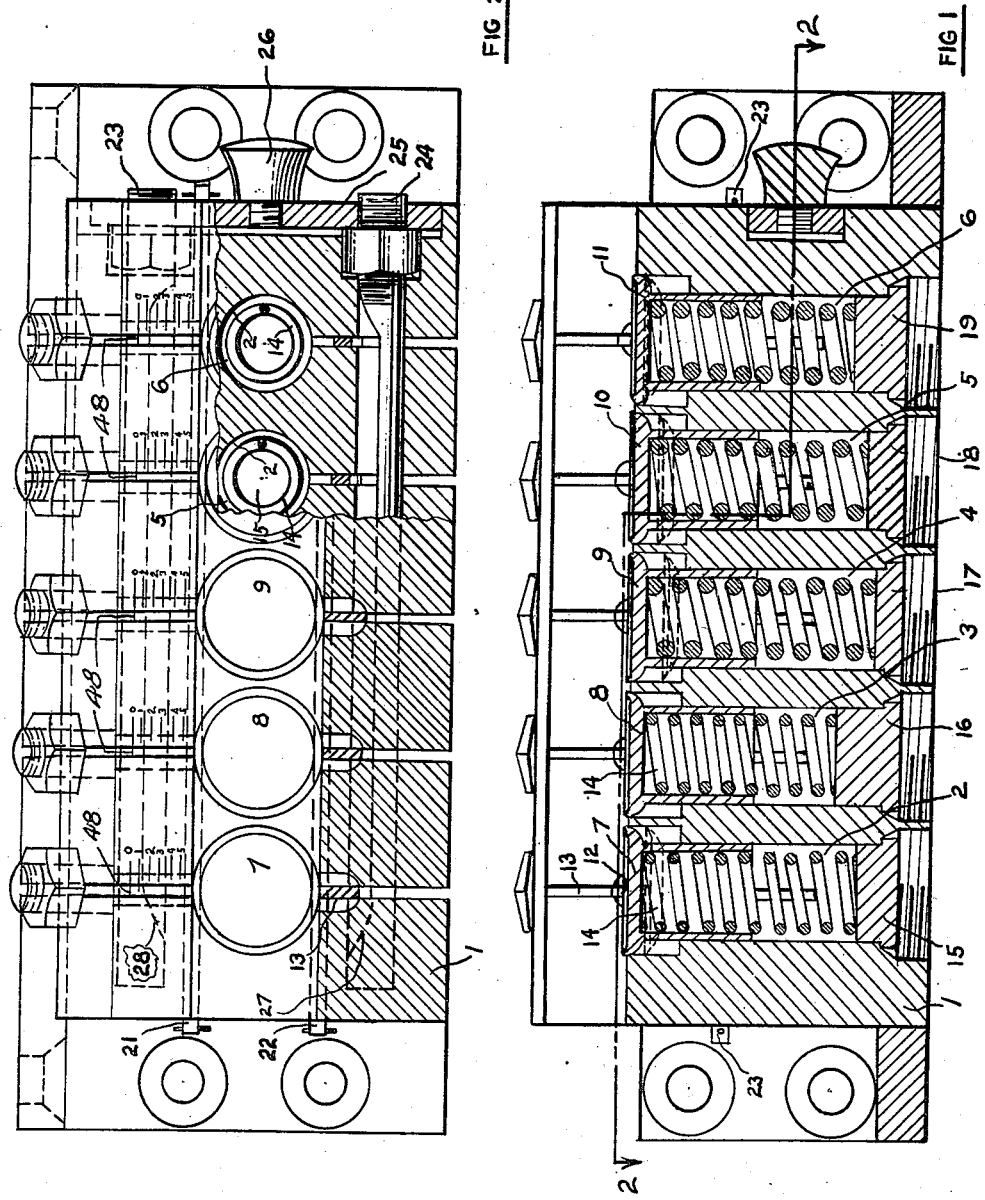
Inventor
CHARLES E CREDE
By
Attorney Dec. 7, 1948.  C. E. CREDE  2,455,356
SHOCK GAUGE
Filed July 4, 1944  3 Sheets-Sheet 2

INVENTOR
CHARLES E CREDE
By W. Glenn Jones
Attorney

Dec. 7, 1948.  C. E. CREDE  2,455,356
SHOCK GAUGE
Filed July 4, 1944  3 Sheets-Sheet 3
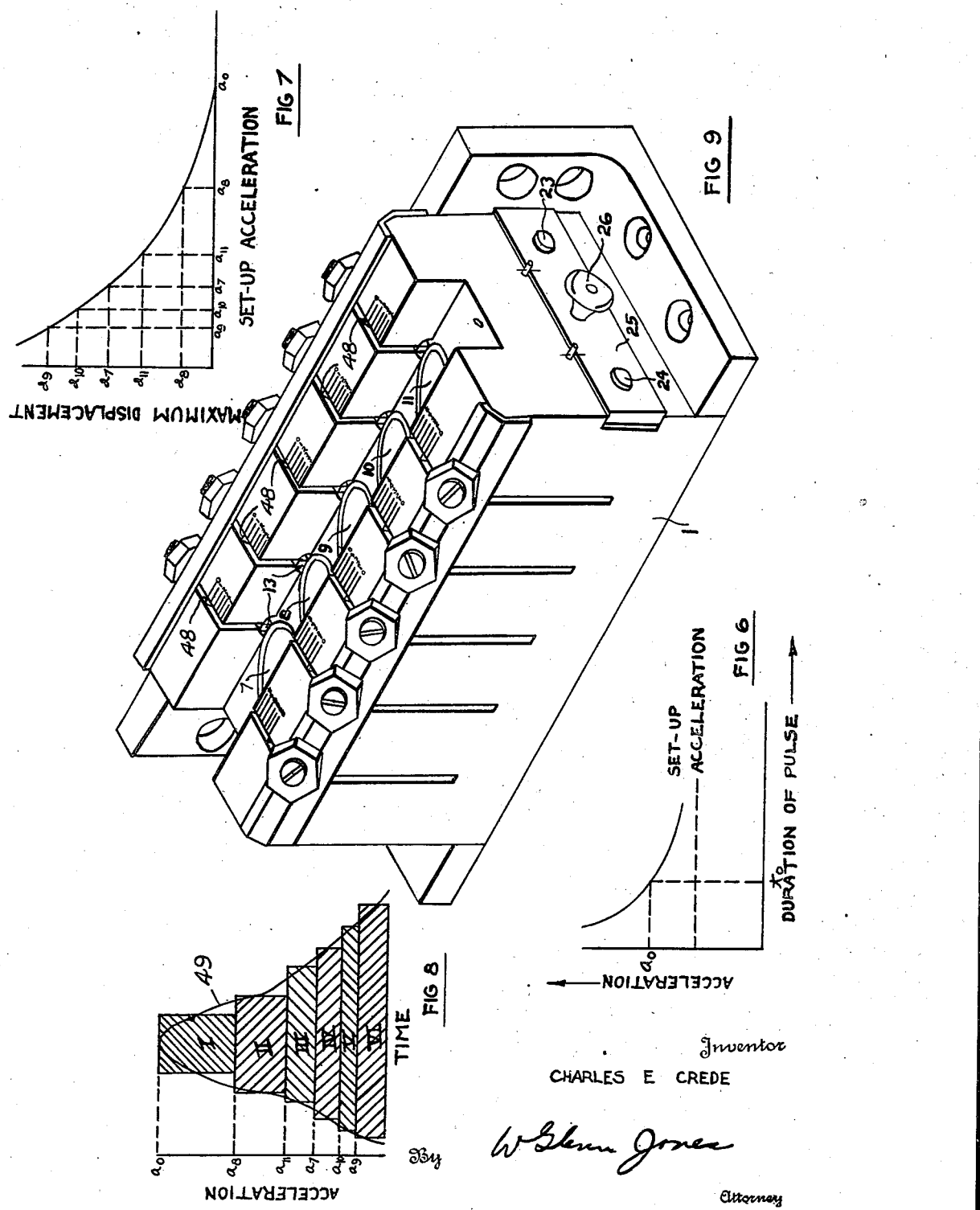
Inventor
CHARLES E. CREDE
By W. Glenn Jones
Attorney Patented Dec. 7, 1948

2,455,356

UNITED STATES PATENT OFFICE 2,455,356

SHOCK GAUGE

Charles E. Crede, Alexandria, Va.

Application July 4, 1944, Serial No. 543,484

3 Claims. (Cl. 73—12)

(Granted under the act of March 3, 1883, as amended April 30, 1928; 370 O. G. 757)

The subject invention relates to shock gages for measuring the acceleration imparted to rigid structural units which are subjected to shocks, such as gun barrel slides or mounts, railway apparatus, pile drivers, rolling mills, etc.

Various types of equipment used aboard a warship, e. g., have to withstand shocks of rather high magnitude. The designer of this equipment is therefore required to know the nature and magnitude of the shock. Knowledge of the magnitude of the shock is also required in the design of shock mounting and in formulating laboratory tests for testing the equipment developed. Shock is usually evaluated by measuring either the acceleration, the velocity or the displacement as a function of time. These characteristics can be measured with a reasonable degree of accuracy with existing instruments, but the required apparatus is ordinarily rather bulky, including much electronic gear, such as the oscillograph and amplifiers. It requires considerable time to set up for operation; it gets out of order easily; and it requires skilled operators to enable it to function properly. Such apparatus is therefore not generally satisfactory for use in field tests where ruggedness and lack of complexity are prime requisites for testing equipment.

Many simple instruments for measuring shock have been devised for particular use on ship board tests. Some of these include mass load tensile specimens which are broken by the application of a sufficient acceleration; spring loaded electrical contacts which are operated to actuate an electric circuit; a lead strip and a steel ball in which the steel ball indents the lead when the assembly is accelerated; and numerous other similar devices. These devices all work upon the well-known principle that if a force acting upon a known mass can be measured, the acceleration which results from such force can be determined. In the instruments mentioned the force was that necessary to break a tensile specimen, to cause contacts to break, or to indent the piece of lead. This principle is entirely rigorous for measuring acceleration, but unfortunately acceleration alone does not constitute shock. It is necessary to know the duration of the acceleration and in this consideration the instruments which measure acceleration alone are not satisfactory for evaluating the shock. These facts lead to the development of the shock gage which will be described in the following paragraphs.

The object of the present invention is to construct an instrument which will measure not only the maximum acceleration produced by a shock but also the duration of the component accelerations of lesser magnitude characterizing the shock in building up to its maximum acceleration.

A further object is to construct a simple instrument for measuring the characteristics of a shock by means of registering the maximum displacement therein of a series of masses urged against displacement by graduated resilient means.

A further object is to construct an instrument for measuring the amount and duration of the acceleration transmitted to a structural unit by a shock.

A further object is to construct an instrument having a mass held against displacement in the end of a cylinder by a spring of predetermined strength and means for indicating the maximum displacement of said mass resulting from the application of an impulse to said instrument thus indicating the duration of any acceleration corresponding to the strength of said spring or greater.

Figure 3:
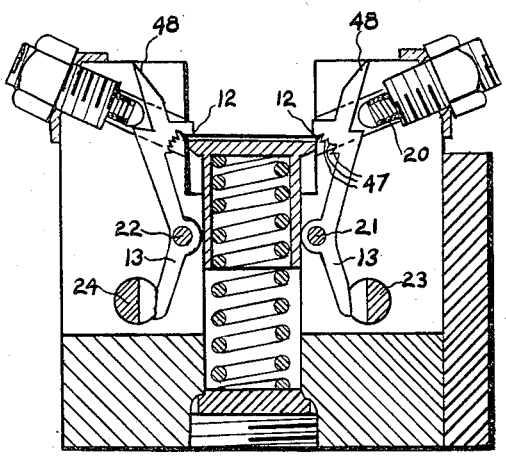
Figure 5:
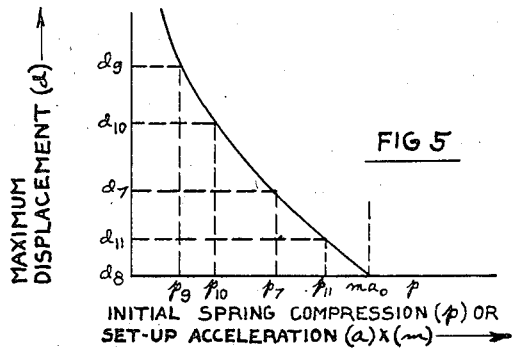

Other and more specific objects will become apparent in the following detailed description accompanied by the drawings, wherein:

Fig. 1 is a central section taken along the longitudinal axis of one form of instrument constructed in accordance with this invention, Fig. 2 is a plan view thereof, partly in section, along the lines of 2—2 of Fig. 1, Fig. 3 is a transverse section through one of the masses in the instrument, Fig. 4 is an acceleration-time diagram illustrating a theoretical square pulse, Fig. 5 shows how the maximum acceleration transmitted to the instrument may be determined, Fig. 6 illustrates an acceleration-duration curve for a particular mass displacement $(d)$, which will satisfy the equation $d = \frac{1}{2} at^2$, Fig. 7 is a displacement-acceleration curve plotted in accordance with one set of values obtained from the instrument in a test, showing how the curve is extended to the zero displacement coordinate to determine the maximum acceleration, Fig. 8 illustrates how the actual acceleration-time curve of the shock measured might appear when developed from the values obtained in Fig. 7 with the aid of curves of the type shown in Fig. 6 made up for the different displacements of the masses in the instrument, and Fig. 9 is a perspective view of the instrument.

The principle on which this gage operates is explained by means of the diagrams in the drawings, Figs. 4 to 8.

The gage, in the form shown in Figs. 1 to 3 is comprised of a block 1 having a plurality of vertically extending cylinders 2, 3, 4, 5, and 6 in which small masses 7, 8, 9, 10, and 11 respectively are free to slide. Rigid stops are provided by the uppermost notches 12 of pivoted ratchet members 13 for limiting the upward movement of the masses in their normal released positions. Each mass is pushed against the two stops on its diametrically opposite ratchet members by helical spring 14 underneath the mass. Each spring has a different initial compression which is provided by spacers or pedestals 15, 16, 17, 18, and 19 under the springs, each spacer having a different height. The spacer 17 is the lowest 18, 15, 19, and 16 following in that order in height respectively. The additional notches on the pivoted ratchet members 13 are for determining the lowest position to which each mass is displaced by shock. Each ratchet member is provided with a spring 20 for urging it against the top of the mass.

The notches on the ratchet members bear against the upper lip of their piston mass so that when the piston moves downwardly relative to the block, the upper arms of the ratchet members move toward each other and the notches 47 in the members catch the piston at approximately its lowest position. The extreme upper ends 48 of the ratchet members are pointers which indicate by the index marks on top of the block, the number of notches which the member has moved towards the center of the block. Having determined the movement of the upper ends of the ratchet members toward the center of the block, it is possible to determine the downward movement of the piston mass which would enable the members to move as measured.

Assume now that the body of the gage is subjected to a shock which for purposes of simplicity can be assumed as the square pulse shown on the acceleration-time diagram of Fig. 4. This will move the body of the gage upwardly at an acceleration $(a_0)$ for a time interval $(t_0)$. The relation between the applied acceleration pulse and the magnitude of the initial spring compression may be such that the lowest positions reached by each of the masses are the dotted lines shown in Fig. 1. As mentioned above, means are provided for determining the lowest position reached or maximum displacement of each mass. Calling the maximum displacement of each mass $d$, the curve shown in Fig. 5 may be plotted. The coordinates of this curve are the initial spring compressions $p$ as abcissae and the maximum displacements $d$ of each mass as ordinates.

It will be seen from Fig. 5 that as the initial spring compression is increased the maximum displacement of the mass is decreased. If the product of the initial spring compression and the inverse of the mass supported upon the spring barely exceeds the applied acceleration $(a_0)$ the maximum displacement $d$ of the mass will be infinitesimally small. A curve drawn through the displacement points in Fig. 5 extended to the horizontal axis intersects this axis at some value $(p_0)$ of spring compression which when divided by the mass which the spring supports gives the magnitude of the applied acceleration $(a_0)$.

Assume that the gage is subjected to any unknown square pulse. The initial spring compression for any mass is known from the set-up of the gage and the maximum displacement of that mass is determined by the means provided as part of the gage. Such a displacement could have been caused by any one of an infinite number of combinations of acceleration with time, either a high acceleration lasting for a short time or a low acceleration lasting for a long time. The various combinations of acceleration and time which could have produced this displacement are plotted in Fig. 6. Since the magnitude of the acceleration $(a_0)$ was determined from Fig. 5 by the intersection of the curve with the horizontal axis, the duration $(t_0)$ of this acceleration can be determined from the curve of Fig. 6.

The above paragraph describes the operation of the subject gage for measuring square pulse shocks. A square pulse shock almost never occurs in practice but the gage may be used to evaluate any shock to the desired approximations by dividing it into a series of square pulses. For example, the gage is subjected to a shock and a curve as shown in Fig. 7 is plotted from the gage readings. The maximum acceleration $(a_0)$ is determined as previously described. Now consider some acceleration $(a_8)$ which is determined by the initial compression in one of the springs (supporting mass 8). If the applied acceleration is less than $(a_8)$, the displacement of the respective mass is zero but if the applied acceleration is greater than $(a_8)$ the maximum displacement $(d_8)$ of the mass is determined by duration of the applied acceleration and the amount by which it exceeds $(a_8)$. Fig. 7 is used to determine $(a_0)$ and the duration of the pulse I, as shown in Fig. 8, can be determined from a curve of the type shown in Fig. 6. Now consider some lower acceleration $(a_{11})$. The maximum displacement $(d_{11})$ is caused by the pulse I (of known size) plus the pulse II of heretofor unknown size. Since the displacement $(d_{11})$ is recorded by the gage the pulse II can be determined. In a similar manner each successive square pulse III, IV, V, and VI, respectively, can be calculated and plotted as shown in Fig. 8, and a smooth curve 49 drawn through the pulses indicates the actual pulse. The accuracy of the method is determined by the size of the increments taken. The acceleration-time curve which results defines the shock to which the gage was subjected.

The ratchet members 13 are pivoted on a pair of shafts 21 and 22 running axially through the body of the instrument on opposite sides of the cylinders. Another pair of bars 23 and 24 running through the body of the instrument also on opposite sides of the cylinders, slightly below the shafts 21 and 22, are joined together at one end by the cross piece 25 having a knob 26. The bars 23 and 24 have diagonal cam surfaces 27 and 28 respectively for cocking the ratchet members to their initial positions, bringing all the mass elements up against the uppermost notches of their respective ratchet members. For releasing the mass to their normal uppermost positions the bars 23 and 24 are simultaneously pulled out manually by means of the knob 26. After all the masses have been brought up by their respective springs to their normal positions these bars are slid back into place. The instrument is then ready for another test.

In making a test to determine the characteristics of any shock the instrument is rigidly mounted on the unit to which the shock is imparted, in a position so that the axis of the cylinders are parallel to the direction of the shock.

Although the drawings show a specific form of the present invention, it is obvious that any number of other forms and modifications might be made without departing from the spirit and scope of this invention as defined in the appended claims.

The invention described herein may be manufactured and used by or for the Government of the United States of America for governmental purposes without the payment of any royalties thereon or therefor.

What is claimed is:

1. A shock gage for mounting on a body subjected to a shock, comprising a casing having a series of bores therein axially aligned with the direction of the shock force, a mass mounted for sliding movement in each bore, stops for said masses at the end of each bore, resilient means exerting different forces on the several masses for urging the masses against said stops in a direction opposing the displacement of the masses relative to said casing during said shock, means for catching and holding each mass at its maximum displacement having means for indicating the amounts of said displacement, and means to release said holding means and thus permit the resilient means to return all the masses to the positions they held prior to said shock.

2. A shock gage for mounting on a body subjected to shock, comprising a casing having a series of bores therein axially aligned with the direction of the shock force, a mass mounted for sliding movement in each bore, a stop for each mass at the end of its corresponding bore, resilient means exerting different forces upon the several masses for urging the masses against said stops in a direction opposing the displacement of the masses relative to said casing during said shock, one-way ratchet means for catching and holding each mass at its maximum displacement having means for indicating the amounts of said displacement, and means for releasing said holding means and thus return all the masses to the positions they held prior to said shack.

3. A shock gage comprising a body having a plurality of sockets therein, a series of movable masses one disposed in each of said sockets, resilient means for each mass aligned with and in opposition to the applied shock force exerting different forces upon the several masses, whereby said masses move different distances under the influence of said shock, means for catching and holding each mass at its maximum displacement having means for indicating the amounts of said displacement, and means to release said holding means and thus permit the resilient means to simultaneously return all masses to the positions they held prior to said shock.

CHARLES E. CREDE.

REFERENCES CITED

The following references are of record in the file of this patent:

UNITED STATES PATENTS

| Number | Name | Date |
| --- | --- | --- |
| 1,397,525 | Kennedy | Nov. 22, 1921 |
| 1,519,473 | Zahm | Dec. 16, 1924 |
| 1,573,133 | Beyer | Feb. 16, 1926 |
| 1,745,522 | Baskerville | Feb. 4, 1930 |
| 2,163,847 | Perrey | June 27, 1939 |
| 2,190,866 | Duby | Feb. 20, 1940 |
| 2,319,342 | Perrey | May 18, 1943 |

FOREIGN PATENTS

| Number | Country | Date |
| --- | --- | --- |
| 378,638 | Germany | July 24, 1923 |
| 504,657 | Germany | Aug. 12, 1930 |